3,287,414
METHOD FOR PREPARING STABILIZED FORMALDEHYDE
Kenichi Fukui and Tsutomu Kagiya, Kyoto, Hisao Yokota, Kobe, Yozo Ohtsuka, Osaka, Masatsune Kondo, Ikeda-shi, and Seizo Nakashio, Nishinomiya-shi, Japan, assignors to Sumitomo Chemical Company, Ltd., and Sumitomo Atomic Energy Industries, Ltd., Osaka, Japan, both corporations of Japan
No Drawing. Filed Oct. 18, 1963, Ser. No. 317,156
Claims priority, application Japan, Feb. 13, 1963, 38/7,757
3 Claims. (Cl. 260—606)

The present invention is concerned with a method for preparing stabilized formaldehyde. In another aspect, it is concerned with a method for stabilizing formaldehyde. In still another aspect, it is concerned with a stabilized formaldehyde composition.

Recently, the fact has been known that high molecular weight polymer of formaldehyde possesses specific properties suitable as materials of plastics. With the development of its broad usages, various methods for manufacturing this polymer have been established, such as those employing ultraviolet ray, ionizing irradiation, or a catalyst, as polymerization-accelerating means. Formaldehyde employed as material in the polymerization methods is prepared, in general, by pyrolysis of a low molecular weight polymer of formaldehyde, such as α-polyoxymethylene and paraformaldehyde. It is well known that monomeric formaldehyde is exceedingly unstable as found from its chemical structure, and readily polymerizes in the presence of water, formic acid, or other substances, to form a low molecular weight polymer. Formaldehyde prepared by pyrolysis as mentioned above always contains a slight amount of water. Therefore, such a technical difficulty is ordinarily encountered that a conduit tube or other portion in the reaction system is blockaded due to the formation of a low molecular polymer through re-polymerization of the formaldehyde rapidly occuring when it is cooled to nearly ordinary temperature. Accordingly, the preparation of monomeric formaldehyde used for the production of high molecular weight formaldehyde polymer has heretofore been conducted by pyrolysis of a low molecular weight formaldehyde polymer, followed by passage of the generated formaldehyde gas through a cooling zone kept at a temperature of approximately −20° C., where a disproportionation reaction is forced to occur in order to remove the moisture. However, such a monomeric formaldehyde is still comparatively reactive, and a low molecular weight polymer is again formed while kept in the liquid state. Thus, it is an important problem to prepare a stable monomeric formaldehyde employable for the production of high molecular weight formaldehyde polymer, the latter being highly demanded commercially.

Accordingly, an object of the present invention is to provide a novel method for preparing stabilized formaldehyde which can be used for the production of high molecular weight formaldehyde polymer having superior properties, in high conversion. Another object of the invention is to provide a method for stabilizing formaldehyde employable for the production of high molecular weight formaldehyde polymer, by a simple procedure using a low-priced material. Still another object is to provide a stabilized formaldehyde composition which can be employed for the production of high molecular weight formaldehyde polymer having superior properties in high conversion. Other objects and advantages would be apparent from the following description.

The present invention is based primarily upon the discovery of the fact that the polymerization reaction of formaldehyde is retarded by carbon dioxide gas mixed therein even in a slight amount. On the other hand, the present inventors have come to deduce, after their broad researches, that water even in a slight amount forces to start a low molecular weight polymerization of such formaldehyde monomer prepared by pyrolysis of a low molecular weight formaldehyde polymer as mentioned above, and that the water forms protons in the system, which act as catalyst to promote the polymerization. Such an amount of water can, of course, be removed by a careful purification of the formaldehyde to a considerable extent. However, the minimum amount of water which causes the commencement of the polymerization reaction is smaller than that removable according to the purification method now employed and is so slight that it is hardly detected by the measuring method now employed.

Consequently, the inventors made further investigations on a chemical method to suppress the commencement of the polymerization reaction promoted by protons which is originated in a slight amount of water present, and have found that anhydrides of inorganic and organic acids can retard the polymerization of formaldehyde.

To accomplish the objects as mentioned above, the inventors propose a method for preparing stabilized formaldehyde and a method for stabilizing formaldehyde, in which monomeric formaldehyde is mixed with an anhydride of inorganic and organic acids.

Liquid monomeric formaldehyde tends to solidify due to the polymerization at about 0° C. within a few minutes if it is kept without any treatment. When it is treated in accordance with the method of the invention, however, it has been recognized that even such an unstable formaldehyde can be stored for a considerably long period of time at approximately room temperature in the form of sufficiently stable liquid in a pressured vessel, preventing the formation of a low molecular weight formaldehyde polymer. Since the acid anhydride can easily be separated by a simple way, such as distillation, etc., the monomeric formaldehyde thus prepared or stabilized can be employed without any problem for the production of the high molecular weight polymer according to any of the conventional methods using ultraviolet, ionizing irradiation or a catalyst as the accelerating means.

In carrying out the method of the invention, monomeric formaldehyde may be of any origin. In general, it is generated from a low molecular weight formaldehyde polymer, such as α-polyoxymethylene and paraformaldehyde, regardless of the form or shape, such as particles, flakes, or the others. Or, it may be prepared from trioxane, the trimer of formaldehyde. The low molecular weight polymer material is placed beforehand in a pyrolysing vessel and the vessel is heated, or is continuously charged into the vessel while the latter is heated, and the thus generated monomeric formaldehyde gas is recovered as it stands or by liquefaction, after or without purification by a disproportionation polymerization method.

The inorganic and organic acid anhydrides employed in the present invention involve carbon dioxide, maleic anhydride, itaconic anhydride, acetic anhydride, succinic anhydride, and the like, which may be used singly or as a mixture. Such an acid anhydride is mixed with monomeric formaldehyde. When formaldehyde is in liquid state or in a solution, any acid anhydride may be used. When formaldehyde is in gas state, a gaseous acid anhydride, such as carbon dioxide, is suitable.

The amount of the acid anhydride to be mixed varies depending upon the kind and the other conditions, such as storing temperature and kind of solvent if used. Ordinarily, an amount of 0.001% to 50%, preferably 0.01% to 10%, by weight based upon weight of formaldehyde is employed.

When a gaseous acid anhydride such as carbon dioxide is mixed with liquefied formaldehyde placed in a vessel, the anhydride may be fed to the space portion of the vessel under a subatmospheric, atmospheric or superatmospheric pressure, whereby a part of the anhydride dissolves into the formaldehyde. In one embodiment of the method of the present invention, the pyrolysis of a material low molecular weight solid polymer such as α-polyoxymethylene and paraformaldehyde may be effected in the presence of, or under continuous addition of, the gaseous acid anhydride such as carbon dioxide or a mixture thereof with an inert gas such as nitrogen, helium, argon and the like. In mixing the acid anhydride with formaldehye, the system is preferably shielded from air.

Formaldehyde thus stabilized may be stably stored in gaseous or liquid state. If desired or required, it may be stabilized or stably stored in the form of a solution in an organic solvent, or solvent mixture, such as liquid hydrocarbon.

By mixing or dissolving the acid anhydride, monomeric formaldehyde can be prevented from the formation of protons, and can be kept stable without formation of the undesirable polymer for a long period. By use of a formaldehyde thus prepared or stabilized, a high molecular weight formaldehyde polymer having superior properties can be produced in high conversion, since the contamination of any low molecular weight polymer formed during storage period, is prevented. The acid anhydride can readily be separated from the stabilized formaldehyde, for example, by distillation.

This invention would be more clearly understood by the following working examples, which are, however, presented merely in way of illustration and not in way of limitation.

EXAMPLE 1

Into a 30 ml.-volume glass ampoule, which has preliminarily been deaerated in vacuo and is cooled at −78° C., was charged 5 g. of formaldehyde through condensation. Fifty milliliters of carbon dioxide gas was fed to the ampoule and the ampoule was fused, whereby the space upon the liquid formaldehyde phase was filled with the carbon dioxide gas. The ampoule thus made was allowed to stand in a cooling bath at −10° C. for 6 hours. Thereafter, the ampoule was opened and the content was dissolved in ethyl ether. The undissolved solid substance was filtered off, which weighed 230 mg.

On the other hand, the same ampoule to which, however, no carbon dioxide had been added was allowed to stand at −10° C. for 30 minutes, and the ampoule was opened. The undissolved solid substance weighed 4.7 g.

In these experiments, the formaldehyhde material was prepared and purified by pyrolysis of α-polyoxymethylene at 200° C., followed by drying by contact with silica gel kept at 0° C.

EXAMPLE 2

To an ampoule containing 5 g. of formaldehyde, which was prepared as in Example 1, was fed 50 ml. of carbon dioxide gas. The ampoule was fused and allowed to stand in a cooling bath at −10° C. for 24 hours. The polymerized solid substance yielded according to the procedure weighed 340 mg.

EXAMPLE 3

To an ampoule containing 5 g. of formaldehyde, which was prepared as in Example 1, was fed 200 ml. of carbon dioxide gas. The ampoule was fused and allowed to stand in an ice bath at 0° C. for 10 hours. Polymerized formaldehyde weighed 61 mg.

While the ampoule containing no carbon dioxide yielded 4.8 g. of polymerized formaldehyde after being kept at 0° C. for 20 minutes.

EXAMPLE 4

To an ampoule containing 5 g. of formaldehyde, which was prepared as in Example 1, was fed 200 ml. of carbon dioxide gas. The ampoule was fused and allowed to stand in an ice bath at 0° C. for 48 hours. The isolated polymer weighed 122 mg.

EXAMPLE 5

An amount of maleic anhydride purified by vacuum distillation method was placed in a 30 ml.-volume glass ampoule, which was then deaerated. While being kept at −196° C., the ampoule was charged with an amount of formaldehyde prepared according to the procedure as described in Example 1, through condensation. The ampoule was fused and allowed to stand in an ice bath at 0° C. for 1 hour. Thereafter, the isolated solid polymer was separated and weighed.

The results are summarized below.

| Formaldehyde (g.) | Maleic anhydride (g.) | Solid polymer (g.) | Conversion (wt. percent) |
|---|---|---|---|
| 8.2 | 0 | 7.7 | 94 |
| 6.9 | 0 | 6.7 | 97 |
| 6.9 | 0.10 | 0.09 | 1.3 |
| 8.7 | 0.50 | 0.13 | 1.5 |
| 9.6 | 2.00 | 0.11 | 1.1 |

As seen from the table, addition of maleic anhydride obviously exhibits the stabilization effect.

What we claim is:

1. A stabilized composition comprising formaldehyde and between 0.001% to 50% by weight based on the amount of formaldehyde of a weak acid anhydride selected from the group consisting of carbon dioxide, maleic anhydride, itaconic anhydride, acetic anhydride, succinic anhydride, and mixtures thereof.

2. A stabilized composition according to claim 1, wherein said weak acid anhydride is present in an amount between about 0.01% to 10% by weight based on the weight of formaldehyde.

3. A stabilized composition comprising monomeric formaldehyde and about 0.01 to 50% by weight, based on the amount of formaldehyde, of carbon dioxide.

References Cited by the Examiner

FOREIGN PATENTS 1,106,749  5/1961  Germany.

OTHER REFERENCES

Montecatini, Chem. Abs., vol. 59, col. 7724 (1963).
Walker, "Formaldehyde," 2d edition, pp. 133 to 137 (1953).

LEON ZITVER, *Primary Examiner.*

B. HELFIN, *Examiner.*

J. J. SETELIK, R. H. LILES, *Assistant Examiners.*